May 22, 1923.
G. M. ARROWSMITH
1,456,294
TOOTH SEPARATOR
Filed Dec. 17, 1921
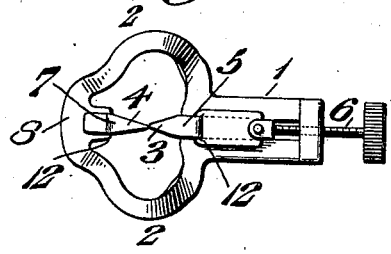
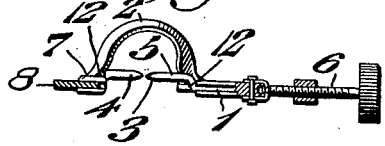
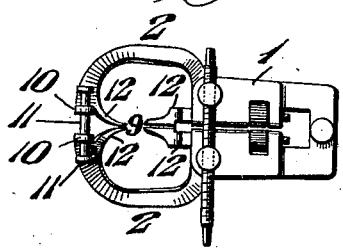
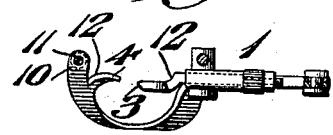
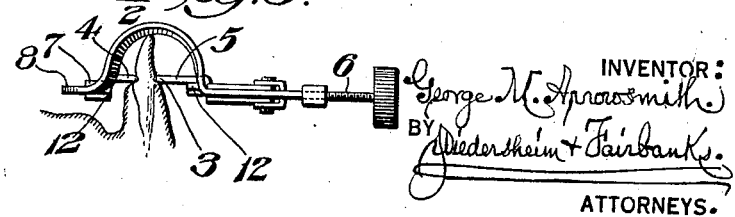

Patented May 22, 1923.

1,456,294

UNITED STATES PATENT OFFICE.

GEORGE M. ARROWSMITH, OF KANSAS CITY, MISSOURI, ASSIGNOR TO JAMES W. IVORY, OF PHILADELPHIA, PENNSYLVANIA.

TOOTH SEPARATOR.

Application filed December 17, 1921. Serial No. 523,001.

*To all whom it may concern:*

Be it known that I, GEORGE M. ARROWSMITH, a citizen of the United States, residing at Kansas City, in the county of Jackson, State of Missouri, have invented a new and useful Tooth Separator, of which the following is a specification.

My invention relates to a tooth separator and consists in forming the wedges or separating points whereby they are angularly deflected from the adjacent portion of the frame of the device so that they provide additional room for finishing a filling and instrumentation generally, without cutting into said portion of the frame.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a plan view of a tooth separator embodying my invention.

Figure 2 represents a central longitudinal section thereof.

Figure 3 represents a section similar to Figure 2 showing the application of the separator.

Figure 4 represents a plan view of another form of a tooth separator embodying my invention.

Figure 5 represents a side elevation thereof.

Similar numerals of reference indicate corresponding parts in the figures.

Referring to the drawings.

1 designates the frame of the device. 2 designates the bows one end of each of which is connected with the frame 1. 3 designates one of the wedges or separating points. 4 designates the opposite wedge or separating point. 5 designates the shank of the wedge or point 3, the same being elongated forming a slide which is movably mounted on the side members of the frame 1, and provided with the operating screw 6 which is fitted in the threaded end of the frame 1, and 7 designates the shank of the wedge or point 4, the same being connected with the plate 8 which joins the ends of the bows 2 opposite to the frame 1.

The shank 5 of the wedge or point 3 is doubled so as to freely embrace opposite faces of the frame 1. The shank 7 of the wedge or point 4 is doubled so as to be firmly connected with opposite faces of the plate 8.

In Figures 4 and 5, each wedge or point is formed of separate members 9, and means whereby the points may be spread apart when so desired. In this case the points opposite to the frame having thereon the ears 10 in which is freely fitted the connecting and guiding pin 11. The members thus far described are well known in the art, and no claim of invention is made thereto.

The shanks of the wedges are approximately right angular in form whereby they are offset as at 12 from the adjacent portion of the frame 1 and so deflected from the base of said portion. By this provision considerable room is provided for access to the filling of a tooth between the wedges and adjacent portions of the frame whereby the operation of filling may be finished by strips of sand paper, or by cuttlefish sand paper or other discs in a convenient, practical and complete manner, and for instrumentation generally.

Having thus described my invention what I claim as new and desire to secure by Letters Patent, is:—

1. A tooth separator having a frame, a wedge movably mounted thereon, means for operating said wedge, and a bow on said frame, said wedge having an offset approximately right angular in the direction of its length correspondingly deflecting the wedge from the adjacent portion of the frame.

2. A tooth separator consisting of a frame, a bow on said frame, oppositely disposed wedges respectively on said frame and bow, one of said wedges being connected with said bow, and the other wedge being movably mounted on said frame, and means for operating the movable wedge to and from the opposite wedge, said wedges having offsets approximately right-angular in the direction of their lengths correspondingly deflecting the wedges from the adjacent portion of the bow and frame.

GEORGE M. ARROWSMITH.

Witnesses:
FRANK A. FAYLE,
OWEN L. CORBIN.